United States Patent
Ohmae et al.

(10) Patent No.: US 11,885,444 B2
(45) Date of Patent: Jan. 30, 2024

(54) SLEEVE AND FITTING WITH THE SAME

(71) Applicant: NIPPON PILLAR PACKING CO., LTD., Osaka (JP)

(72) Inventors: Kiyotaka Ohmae, Osaka (JP); Masashi Katanaya, Osaka (JP); Atsushi Nakano, Osaka (JP)

(73) Assignee: NIPPON PILLAR PACKING CO., LTD., Osaka (JP)

( * ) Notice: Subject to any disclaimer, the term of this patent is extended or adjusted under 35 U.S.C. 154(b) by 222 days.

(21) Appl. No.: 17/296,044

(22) PCT Filed: May 14, 2019

(86) PCT No.: PCT/JP2019/019079
§ 371 (c)(1),
(2) Date: May 21, 2021

(87) PCT Pub. No.: WO2020/110348
PCT Pub. Date: Jun. 4, 2020

(65) Prior Publication Data
US 2022/0018471 A1    Jan. 20, 2022

(30) Foreign Application Priority Data
Nov. 30, 2018 (JP) ................. 2018-224631

(51) Int. Cl.
*F16L 47/04*     (2006.01)
*F16L 19/028*   (2006.01)

(52) U.S. Cl.
CPC ....... *F16L 19/0286* (2013.01); *F16L 19/0283* (2013.01); *F16L 47/041* (2019.08)

(58) Field of Classification Search
CPC ... F16L 19/0286; F16L 47/041; F16L 33/223; F16L 19/0283; F16L 33/22; F16L 19/02; F16L 19/04; F16L 47/06; F16L 19/041
See application file for complete search history.

(56) References Cited

U.S. PATENT DOCUMENTS 5,388,871 A * 2/1995 Saitoh ................ F16L 47/041
                                                                285/423
2017/0159854 A1   6/2017 Fujii et al.

FOREIGN PATENT DOCUMENTS

EP    0797041 A2 *  3/1997
EP    0823578 A2 *  2/1998
(Continued)

OTHER PUBLICATIONS

International Search Report dated Jul. 9, 2019 in PCT/JP2019/019079 filed on May 14, 2019, 1 page.

*Primary Examiner* — Zachary T Dragicevich
*Assistant Examiner* — James A Linford
(74) *Attorney, Agent, or Firm* — Oblon, McClelland, Maier & Neustadt, L.L.P.

(57) ABSTRACT

A sleeve, a cylindrical member for connecting a tube to a tubular body of a fitting, includes a first peripheral wall end portion facing a peripheral wall end portion of the tubular body, and a second peripheral wall end portion pressed into an open end of the tube. The first peripheral wall end portion includes either an annular protrusion or groove. The annular protrusion is pressed into an annular groove in the peripheral wall end portion of the tubular body. The annular groove allows an annular protrusion axially projecting from the peripheral wall end portion of the tubular body to be pressed thereinto. The second peripheral wall end portion includes a bulge portion to expand the diameter of the open end of the tube. An outer periphery of the first peripheral wall end portion includes a flange to axially face the peripheral wall end portion of the tubular body.

3 Claims, 3 Drawing Sheets

(56) References Cited

FOREIGN PATENT DOCUMENTS

| | | | | |
|---|---|---|---|---|
| EP | 0855546 A1 | * | 7/1998 | |
| EP | 0872678 A1 | * | 10/1998 | |
| FR | 2 336 623 A1 | | 7/1977 | |
| JP | 08254291 A | * | 10/1996 | ............. F16L 47/04 |
| JP | 11-257572 A | | 9/1999 | |
| JP | 2012193758 A | * | 10/2012 | |
| JP | 5883907 B1 | | 3/2016 | |
| WO | WO-0028254 A1 | * | 5/2000 | ............ F16L 33/223 |

\* cited by examiner

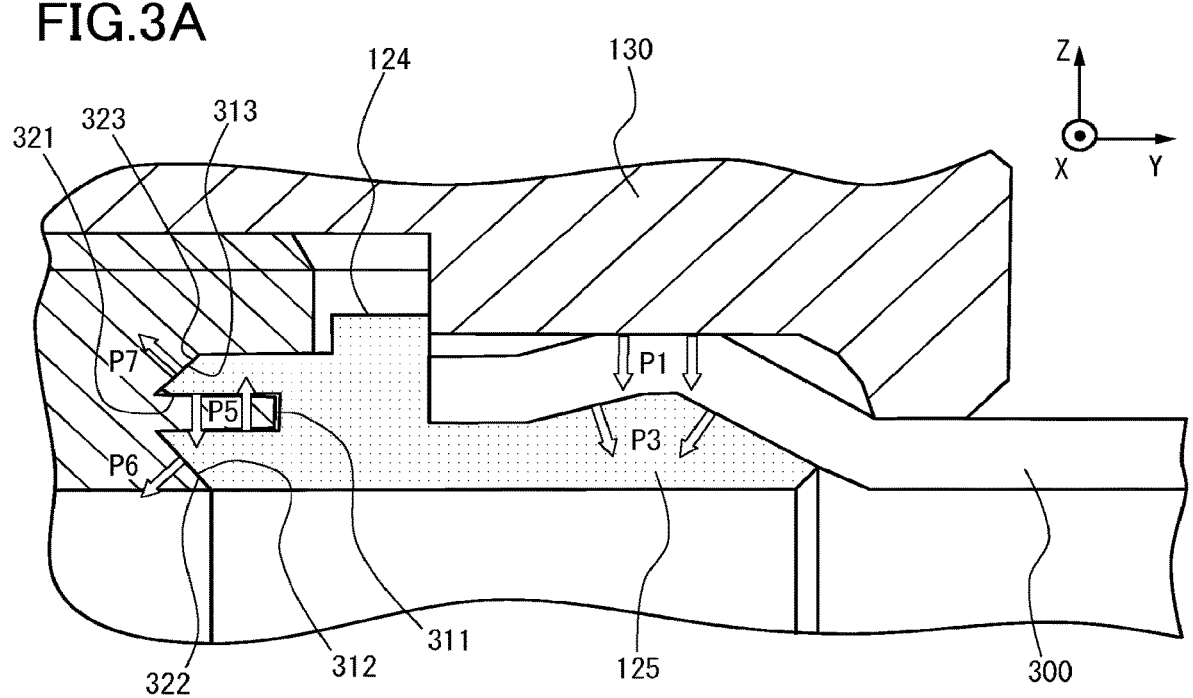
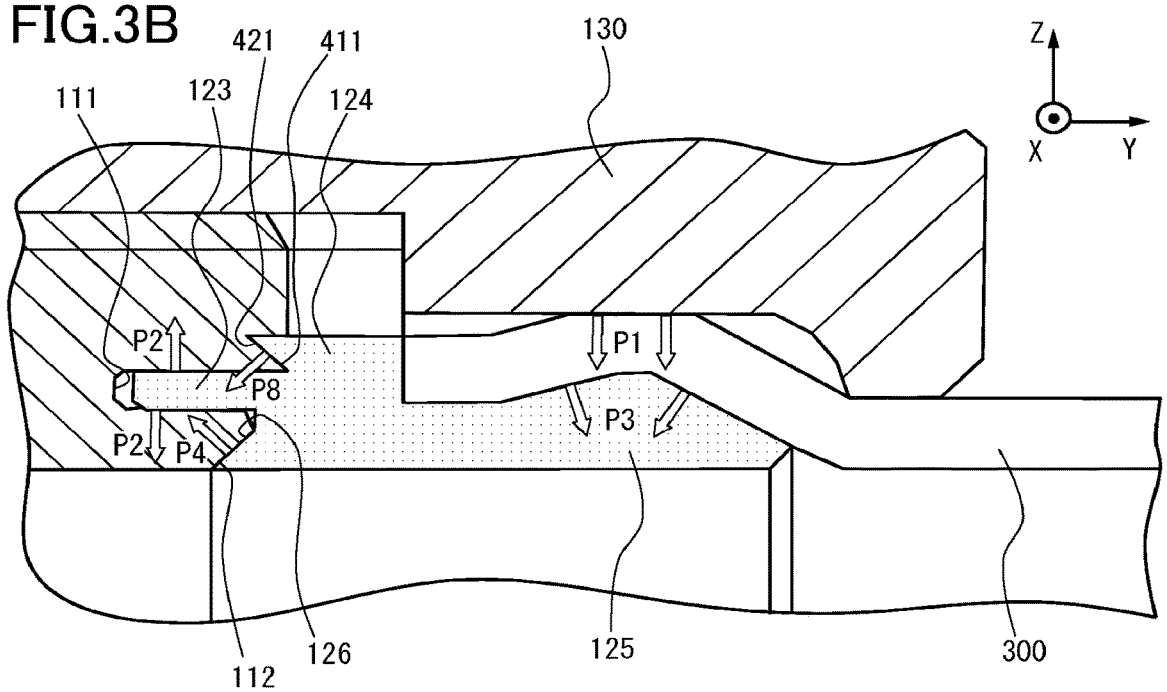

SLEEVE AND FITTING WITH THE SAME

TECHNICAL FIELD

The invention relates to fittings and the likes, in particular, those for being connected to tubes by using sleeves.

BACKGROUND ART

In semiconductor processing, various liquid chemicals are used for application of resists to wafers, cleaning of wafers, and the like. Piping systems treating such chemicals, such as tubes, fittings, valves, and pumps, are included in production lines of semiconductor devices. Such piping systems are characterized by the following features: All portions to be directly wetted by chemicals are made of fluoropolymers; and maintenance such as cleaning is required at relatively frequent intervals. The former aims at preventing metallic contamination from forming crystal defects of semiconductors and deteriorating electric characteristics thereof. The latter aims at preventing particulates from causing defectively manufactured traces and aims at preventing organic materials from causing abnormal film formation. In view of these features, the piping systems are required to be easy to assemble and disassemble, as well as to have excellent sealing properties.

A fitting disclosed in Patent Literature 1, for example, uses a sleeve for connection to a tube, thereby maintaining high sealing properties even when it is reconfigured after disassembled. Like a body of the fitting, the sleeve is made of a fluoropolymer. A first peripheral wall end of the sleeve is pressed into an open end of the tube, and a second peripheral wall end of the sleeve forms a sealing structure together with a peripheral wall end of the fitting body. In the sealing structure, for example, the second peripheral wall end of the sleeve includes an annular protrusion, which projects to an axial direction of the sleeve, extends a circumferential direction of the sleeve, and is pressed into a circumferential and annular groove in the peripheral wall end of the fitting body. Alternatively, the second peripheral wall end of the sleeve may include a circumferential and annular groove, into which an annular protrusion in the peripheral wall end of the fitting body is pressed. Since the annular protrusion has a radial width slightly larger than the annular groove, the annular protrusion after pressed into the annular groove radially presses against and makes contact with the annular groove without any spaces therebetween. As a result, the sealing structure maintains its high sealing properties. When the tube is removed from the fitting, the sleeve is also removed with the tube. This makes removal and reconnection of the tube easier than direct connection of the tube to the fitting body.

CITATION LIST

Patent Literature

Patent Literature 1: JP 5883907 B 1

SUMMARY OF INVENTION

An increased number of steps of semiconductor processing complicate the piping systems. Preventing the increasingly complex piping systems from excessively scaling up production lines of semiconductor devices requires further size reduction of the piping systems. However, for known fittings, in particular, types using the sleeves such as one disclosed in Patent Literature 1, it is difficult to reduce their sizes in the axial direction of the sleeves for the following reason. In such a type of fitting, a portion of the sleeve to be pressed into the tube has to be long enough to prevent the tube from slipping off the sleeve. Accordingly, bending of the tube tends to tilt the axis of the sleeve from an axial direction of the fitting body. Excessive tilt of the axis may reduce the sealing force between the sleeve and the fitting body. In order to avoid the reduction, a peripheral wall end portion of the fitting body includes an external thread, which is a cylindrical structure with a threaded outer periphery. The external thread axially projects from the whole circumference of the peripheral wall end portion of the fitting body, and the projecting length of the external thread is designed to be sufficiently long. An internal surface of the external thread firmly holds the tube and the sleeve to prevent tilt of the axis of the sleeve in spite of bending of the tube. On the other hand, the length of the external thread hampers axial size reduction of the fitting.

An object of the invention is to solve the above-mentioned problems, in particular, to provide a sleeve that enables further axial size reduction of a fitting while causing the fitting to maintain high sealing properties.

According to one aspect of the invention, a sleeve is a cylindrical member for connecting a tube to a tubular body of a fitting. The sleeve includes a first peripheral wall end portion configured to face a peripheral wall end portion of the tubular body and a second peripheral wall end portion configured to be pressed into an open end portion of the tube. The first peripheral wall end portion includes one of an annular protrusion configured to be pressed into an annular groove in the peripheral wall end portion of the tubular body, and an annular groove configured to allow an annular protrusion axially projecting from the peripheral wall end portion of the tubular body to be pressed thereinto. The second peripheral wall end portion includes a bulge portion configured to expand a diameter of the open end portion of the tube from the inside thereof. An outer periphery of the first peripheral wall end portion includes a flange configured to axially face the peripheral wall end portion of the tubular body.

The flange may be axially spaced from the peripheral wall end portion of the tubular body, or alternatively, it may make contact with the peripheral wall end portion of the tubular body. The flange may have a slope angled to an axial direction in an area to be in contact with the peripheral wall end portion of the tubular body.

According to another aspect of the invention, a fitting is used for being connected to a tube. The fitting includes a tubular body, a sleeve, and a nut. The tubular body includes an external thread extending axially. The sleeve is configured to connect the tube to a peripheral wall end portion of the tubular body. The nut includes a first side configured to allow the tube to be inserted thereinto and a second side configured to allow the external thread of the peripheral wall end portion of the tubular body to be screwed thereinto. The sleeve includes a first peripheral wall end portion configured to face the peripheral wall end portion of the tubular body and a second peripheral wall end portion configured to be pressed into an open end portion of the tube. The first peripheral wall end portion includes one of an annular protrusion configured to be pressed into an annular groove in the peripheral wall end portion of the tubular body, and an annular groove configured to allow an annular protrusion axially projecting from the peripheral wall end portion of the tubular body to be pressed thereinto. The second peripheral wall end portion includes a bulge portion configured to expand a diameter of the open end portion of the tube from the inside thereof. An outer periphery of the first peripheral wall end portion includes a flange configured to axially face the peripheral wall end portion of the tubular body.

The above-mentioned sleeve according to the invention includes the flange in the outer periphery of the first peripheral wall end portion. When the tube bends, the flange makes contact with the peripheral wall end portion of the tubular body of the fitting to prevent the axis of the sleeve from being excessively tilted from an axial direction of the tubular body. Thus, the fitting using the sleeve enables further size reduction in the axial direction of the sleeve while it can maintain high sealing properties.

BRIEF DESCRIPTION OF DRAWINGS

FIG. 3A is a vertical cross-section view of a first modification of a sealing structure according to the embodiment of the invention; and FIG. 3B is a vertical cross-section view of a second modification of the sealing structure according to the embodiment of the invention.

DESCRIPTION OF EMBODIMENTS

The following explains embodiments of the invention with reference to the drawings.

Figure 1A:
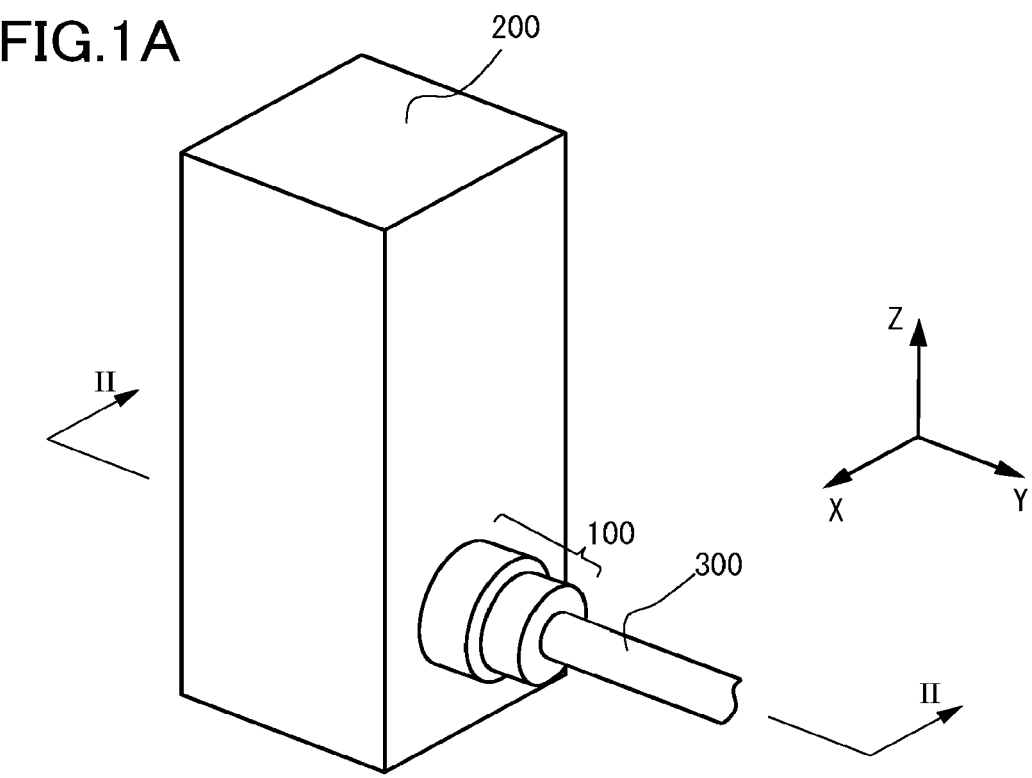
FIG. 1A is a perspective view showing an appearance of a fitting according to an embodiment of the invention.
Figure 1B:
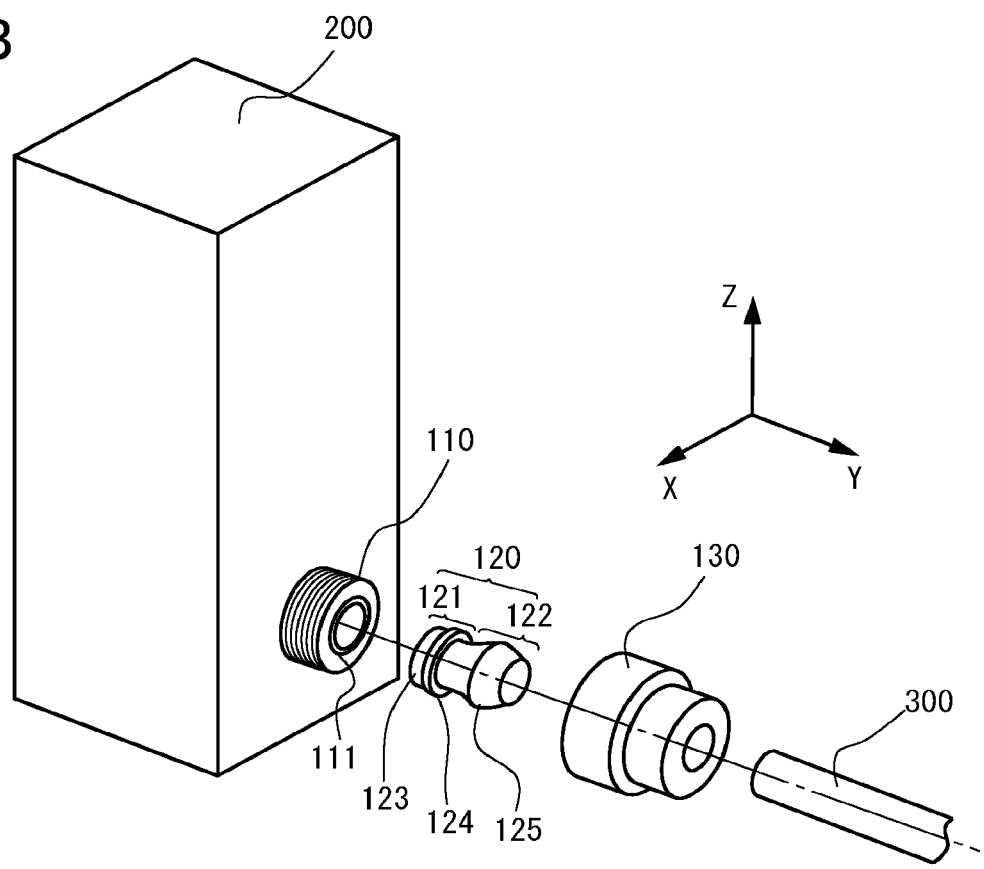
FIG. 1B is an exploded view of the fitting in FIG. 1A.

FIG. 1A is a perspective view showing an appearance of a fitting according to an embodiment of the invention, and FIG. 1B is an exploded view of this fitting 100. The fitting 100 may be located, for example, at an outlet of a pump 200 to connect a tube 300 to the outlet. The tube 300 is a white or translucent tube made of a fluoropolymer such as polytetrafluoroethylene (PTFE) or perfluoroalkoxy alkane (PFA). The fitting 100 includes a tubular body 110, a sleeve 120, and a nut 130.

The tubular body 110 is a cylindrical member made of a fluoropolymer such as PTFE or PFA, which is formed as an external thread, i.e., a cylindrical structure with a threaded outer periphery, whose axial length is shorter than the nut 130. The tubular body 110 is fixed coaxially at the outlet of the pump 200. A peripheral wall end portion of the tubular body 110 has an annular groove 111 extending along the circumference of the peripheral wall end portion.

The sleeve 120 is a cylindrical member made of a fluoropolymer such as PTFE or PFA, which is arranged coaxially with the tubular body 110. The sleeve 120 has the same inner diameter as the tubular body 110. The sleeve 120 has a first peripheral wall end portion 121 facing the peripheral wall end portion of the tubular fitting 110 and a second peripheral wall end portion 122 pressed into an open end of the tube 300. The first peripheral wall end portion 121 includes an annular protrusion 123 and a flange 124 and the second peripheral wall end portion 122 includes a bulge portion 125. The annular protrusion 123 projects from the whole circumference of the first peripheral wall end portion 121 toward an axial direction of the sleeve 120 (a negative Y-axis direction in the drawings) to be pressed into the annular groove 111 of the tubular body 110. The flange 124 projects radially from a proximal end of the annular protrusion 123 of the first peripheral wall end portion 121, i.e., the flange 124 has an outer diameter larger than the annular protrusion 123. The bulge portion 125 has outer diameters gently varying with locations in the axial direction of the sleeve 120 (the Y-axis direction) and a portion of the maximum diameter (a peek) in an axially central portion of the second peripheral wall end portion 122. Since the peek has an outer diameter larger than the inner diameter of the tube 300, the bulge portion 125, by pressed into the open end of the tube 300, expands the open end from the inside. Elastomeric forces of the tube 300 that resist the expansion cause the open end of the tube 300 to enclose the bulge portion 125 of the sleeve 120 so that the open end is firmly fixed to the second peripheral wall end portion 122 of the sleeve 120.

The nut 130 is a cylindrical member made of a fluoropolymer such as PTFE, PFA, polyvinylidene fluoride (PVDF), which is arranged coaxially with the tubular body 110. The nut 130 has an outer diameter larger than any of the tubular body 110 and the sleeve 120. Of peripheral wall ends of the nut 130, the one nearer to the tubular body 110 includes an internal thread, a cylindrical structure with a threaded inner periphery, to engage with the external thread of the tubular body 110. When the external thread of the tubular body 110 is screwed into the internal thread, the nut 130 receives the tubular body 110 and the sleeve 120 thereinto. An open end of the nut 130 located on the opposite side of the nut 130 from the tubular body 110 receives the tube 300 thereinto.

Figure 2B:
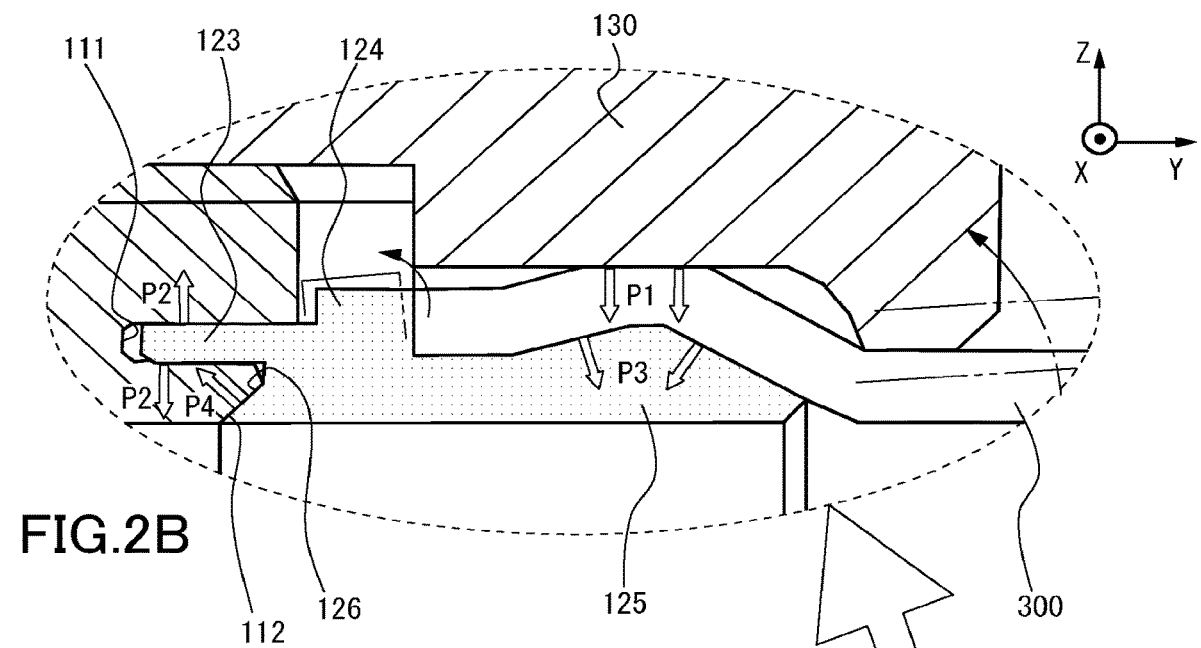
FIG. 2B is an enlarged view of a region enclosed by dashed lines in FIG. 2A.
Figure 2A:
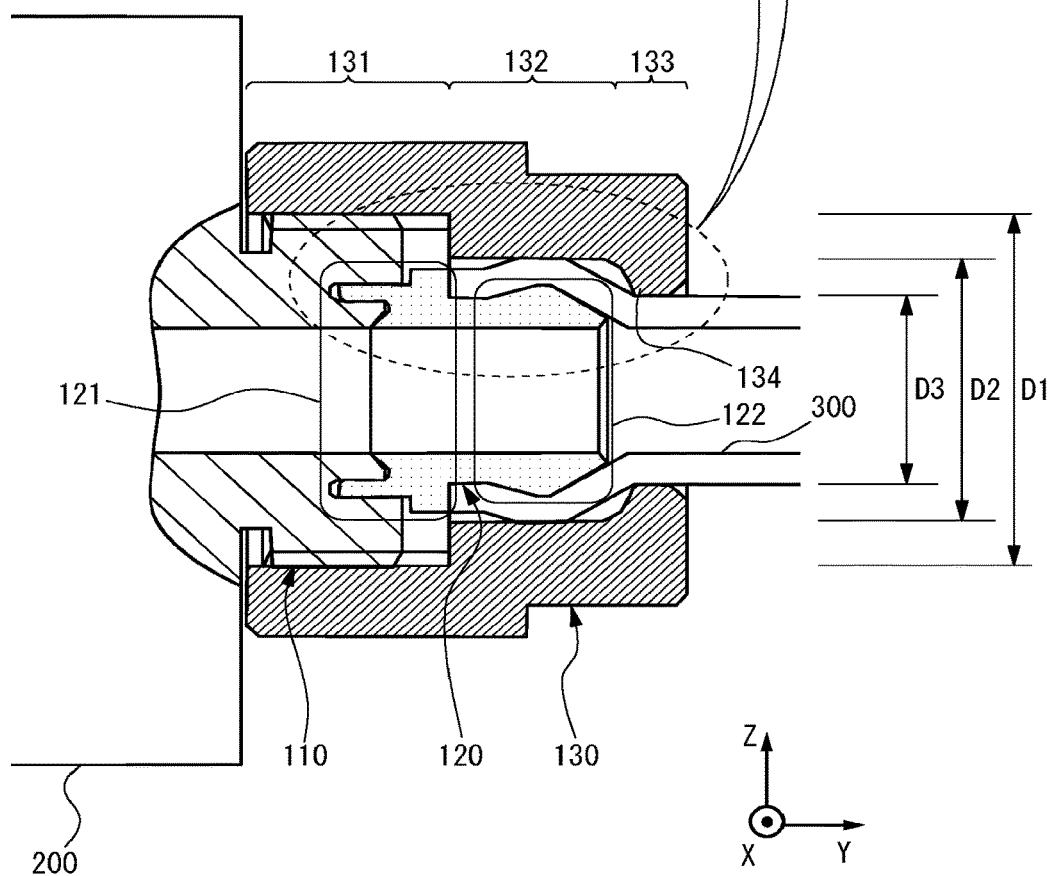
FIG. 2A is a vertical cross-section view along a line II-II in FIG. 1A.

FIG. 2A is a vertical cross-section view along a line II-II in FIG. 1A, and FIG. 2B is an enlarged view of a region enclosed by dashed lines in FIG. 2A. The nut 130 has three different inner diameters; sections of the nut 130 at larger distances from the tubular body 110 in an axial direction (a positive Y-axis direction) have smaller inner diameters. Accordingly, the nut 130 is divided into a first section 131, a second section 132, and a third section 133. The first section 131 is nearest to the tubular body 110; the third section 133 is farthest from the tubular body 110; and the second section 132 is located between the first section 131 and the third section 133. The first section 131 has an inner diameter D1 equal to the outer diameter of the tubular body 110 so that the internal thread of inner periphery of the first section 131 engages with the external thread of the tubular body 110. The second section 132 faces the second peripheral wall end portion 122 of the sleeve 120 across the tube 300. The second section 132 has an inner diameter D2 equal to or slightly smaller than the sum of the outer diameter of the bulge portion 125 of the sleeve 120 and the thickness of the tube 300 so that the inner periphery of the second section 132 makes contact with the outer periphery of the tube 300. In particular, when the inner diameter D2 is smaller than the sum of the outer diameter of the bulge portion 125 of the sleeve 120 and the thickness of the tube 300, radial pressure P1 depending on the difference between the inner diameter D2 and the sum is applied from the inner periphery of the second section 132 to the outer periphery of the tube 300. The third section 133 receives the tube 300 thereinto. The third section 133 has an inner diameter D3 equal to or slightly larger than the outer diameter of the tube 300. Inside the second section 132 of the nut 130, the bulge portion 125 of the sleeve 120 expands the diameter of the tube 300, and accordingly, an end portion 134 of the third section 133 adjacent to the second section 132 slightly digs into the outer periphery of the tube 300. This prevents the tube 300 from slipping off the sleeve 120.

[Sealing Structure Between Body and Sleeve]

The first peripheral wall end portion 121 of the sleeve 120 forms a sealing structure together with the peripheral wall end portion of the tubular body 110. In this sealing structure, the annular protrusion 123 of the sleeve 120 is pressed into the annular groove 111 of the tubular body 110. Since the annular protrusion 123 has a radial width slightly larger than the annular groove 111, the annular protrusion 123 pressed into the annular groove 111 causes radial pressure P2 to be applied from the outer and inner peripheries of the annular protrusion 123 to the inner surfaces of the annular groove 111. Accordingly, the outer and inner peripheries of the annular protrusion 123 press against the outer and inner peripheries of the annular groove 111, respectively, without any spaces therebetween. In the sealing structure, furthermore, the peripheral wall end portion of the tubular body 110 includes a tapered surface 112 and the first peripheral wall end portion 121 of the sleeve 120 includes a tapered surface 126. The tapered surface 112 of the tubular body 110 is located radially inside the annular groove 111 and inclined from an axial direction of the tubular body 110 (the Y-axis direction) to have larger diameters at larger distances from a proximal end of the tapered surface 112 in the axial direction (the positive Y-axis direction.) The tapered surface 126 of the sleeve 120 is located radially inside the annular protrusion 123 and inclined from an axial direction of the sleeve 120 (the Y-axis direction) to have larger diameters at larger distances from a distal end of the tapered surface 126 in the axial direction (the positive Y-axis direction.) The tapered surface 112 of the tubular body 110 and the tapered surface 126 of the sleeve 120 have the same inclination so that they make full contact with each other when the nut 130 is screwed onto the tubular body 110. In addition, the pressure P1 that the second section 132 of the nut 130 applies to the tube 300 and pressure P3 that the tube 300 applies to the bulge portion 125 of the sleeve 120 are transferred as stress through the sleeve 120. This applies pressure P4 from the tapered surface 126 of the sleeve 120 to the tapered surface 112 of the tubular body 110 so that both the tapered surfaces 126 and 112 press against and make contact with each other without any spaces therebetween. Thus, boundary between the tubular body 110 and the sleeve 120 is tightly sealed.

[Role of Flange of Sleeve]

The flange 124 of the sleeve 120 projects from the proximal end of the annular protrusion 123 radially (in the Z-axis direction in FIGS. 2A and 2B.) Of end surfaces of the flange 124, the one nearer to the tubular body 110 is located at a predetermined distance from the tubular body 110, and the other farther from the tubular body 110 is in contact with a peripheral wall end portion of the tube 300.

The flange 124 serves as a supporter to maintain the sleeve 120 in the coaxial configuration with the tubular body 110 against bending of the tube 300, as described below. Bending of the tube 300 tilts the tube 300 from the axial direction of the tubular body 110 (the Y-axis direction), for example, as shown in FIG. 2B by dashed-two dotted lines and an arrow. In response to the tilt, the axis of the sleeve 120 also tilts as shown in FIG. 2B by a dashed-two dotted line and an arrow. When the tilt angle of the axis of the sleeve 120 reaches an acceptable upper limit, a corner of the flange 124 makes contact with the tubular body 110 to prevent the tilt angle from exceeding the acceptable upper limit. In other words, a gap formed by the tubular body 110 and the flange 124 is maintained to have a width such that the tilt angle of the flange 124 does not reach the acceptable upper limit. Thus, the flange 124 can maintain the sleeve 120 in the coaxial configuration with the tubular body 110 within an acceptable range, in spite of bending of the tube 300.

ADVANTAGES OF EMBODIMENT

The sleeve 120 according to the above-described embodiment of the invention includes the flange 124 projecting radially. When the tube 300 bends, the flange 124 makes contact with the tubular body 110. This prevents the axis of the sleeve 120 from being excessively tilted from the axial direction of the tubular body 110 (the Y-axis direction.) In other words, this structure can maintain the sleeve 120 in the coaxial configuration with the tubular body 110 without a portion holding the peripheral wall end portion of the tube 300 on the tubular body 110 in contrast to the structure disclosed in Patent Literature 1. Thus, the tubular body 110 can reduce its axial size without affecting the sealing structure with the first peripheral wall end portion 121 of the sleeve 120 and its sealing performance. As a result, the fitting 100 enables further axial size reduction of the sleeve 120 while maintaining the high sealing properties.

[Modifications]

(1) The fitting 100 according to the above-described embodiment of the invention is located at the outlet of the pump 200. The fitting 100 may be, alternatively, located at an inlet of the pump 200, or at an inlet or outlet of a device other than a pump, such as a valve or a sensor. The fitting 100 may be applied to not only a joint between the device and a tube, but also a joint of tubes.

(2) The flange 124 according to the above-described embodiment of the invention projects radially and continuously from the whole circumference of the first peripheral wall end portion 121 of the sleeve 120. Alternatively, flanges may be discretely arranged or a flange is divided into pieces arranged in a circumferential direction of the first peripheral wall end portion.

(3) As shown in FIGS. 2A and 2B, in the configuration where the sleeve 120 is combined with the tubular body 110, the pressure P4 and its reaction provide the tapered surface 112 of the tubular body 110 and the tapered surface 126 of the sleeve 120 with the same inclination. On the other hand, in a configuration where the sleeve 120 is separated from the tubular body 110, the tapered surface 112 of the tubular body 110 and the tapered surface 126 of the sleeve 120 may have the same inclination or different inclination angles. When the sleeve 120 is combined with the tubular body 110, as described above, the tapered surface 112 of the tubular body 110 receives the pressure P4 from the tapered surface 126 of the sleeve 120, and thus, both the tapered surfaces 112 and 126 press against and make contact with each other without any spaces therebetween even if they have different inclination angles.

(4) In the sealing structure according to the above-described embodiment of the invention, the peripheral wall end portion of the tubular body 110 of the fitting 100 includes the annular groove 111, and the first peripheral wall end portion 121 of the sleeve 120 includes the annular protrusion 123. Reversely, a tubular body may include an annular protrusion and a sleeve may include an annular groove.

FIG. 3A is a vertical cross-section view of a first modification of the sealing structure. This figure is an enlarged view of a region corresponding to the region enclosed by the dashed line in FIG. 2A. The peripheral wall end portion of the tubular body 110 includes an annular protrusion 311, which projects from the whole circumference of the tubular body 110 toward an axial direction (the positive Y-axis direction). The first peripheral wall end portion 121 of the sleeve 120 includes an annular groove 321, which extends along the circumference of the first peripheral wall end portion 121. The annular protrusion 311 is pressed into the annular groove 321. The annular protrusion 311 has a radial width slightly larger than the annular groove 321, and accordingly, when the annular protrusion 311 is pressed into the annular groove 321, outer and inner peripheries of the annular protrusion 311 receive radial pressure P5 from inner surfaces of the annular groove 321. Thus, the outer and inner peripheries of the annular protrusion 311 press against and make contact with outer and inner surfaces of the annular groove 321, respectively, without any spaces therebetween.

In this sealing structure, the peripheral wall end portion of the tubular body 110 includes a first tapered surface 312 and a second tapered surface 313, and the first peripheral wall end portion 121 of the sleeve 120 includes a first tapered surface 322 and a second tapered surface 323. The first tapered surface 312 of the tubular body 110 is located radially inside the annular protrusion 311 and inclined from the axial direction of the tubular body 110 (the Y-axis direction) to have smaller diameters at larger distances from a proximal end of the first tapered surface 312 in the axial direction (the positive Y-axis direction.) The second tapered surface 313 of the tubular body 110 is located radially outside the annular protrusion 311 and inclined from the axial direction of the tubular body 110 (the Y-axis direction) to have larger diameters at larger distances from a proximal end of the second tapered surface 313 in the axial direction (the positive Y-axis direction.) The first tapered surface 322 of the sleeve 120 is located radially inside the annular groove 321 and inclined from an axial direction of the sleeve 120 (the Y-axis direction) to have smaller diameters at larger distances from a distal end of the first tapered surface 322 in the axial direction (the positive Y-axis direction.) The second tapered surface 323 of the sleeve 120 is located radially outside the annular groove 321 and inclined from the axial direction of the sleeve 120 (the Y-axis direction) to have larger diameters at larger distances from a distal end of the second tapered surface 323 in the axial direction (the positive Y-axis direction.) In the configuration where the sleeve 120 is combined with the tubular body 110, the first tapered surface 312 of the tubular body 110 and the first tapered surface 322 of the sleeve 120 have the same inclination, and the second tapered surface 313 of the tubular body 110 and the second tapered surface 323 of the sleeve 120 have the same inclination. That is, when the nut 130 is screwed onto the tubular body 110, both the first tapered surfaces 312 and 322 make full contact with each other, and both the second tapered surfaces 313 and 323 make full contact with each other. As described above, in the configuration where the sleeve 120 is separated from the tubular body 110, the first tapered surface 312 of the tubular body 110 and the first tapered surface 322 of the sleeve 120 may have the same inclination or different inclination angles, and the second tapered surface 313 of the tubular body 110 and the second tapered surface 323 of the sleeve 120 may have the same inclination or different inclination angles. The pressure P1 that the second section of the nut 130 applies to the tube 300 and the pressure P3 that the tube 300 applies to the bulge portion 125 of the sleeve 120 cause pressure P6 to be applied from the first tapered surface 322 of the sleeve 120 to the first tapered surface 312 of the tubular body 110 and pressure P7 to be applied from the second tapered surface 323 of the sleeve 120 to the second tapered surface 313 of the tubular body 110. Accordingly, both the first tapered surfaces 312 and 322 press against and make contact with each other without any spaces therebetween, and both the second tapered surfaces 313 and 323 press against and make contact with each other without any spaces therebetween. Thus, the boundary between the tubular body 110 and the sleeve 120 is tightly sealed.

(5) The sleeve 120 according to the above-described embodiment of the invention is equipped with the flange 124 spaced from the tubular body 110. Accordingly, even when the nut 130 is excessively screwed onto the tubular body 110 by retightening and the like, the flange 124 does not make contact with the tubular body 110. However, the spacing of the flange 124 from the tubular body 110 is not essential, but the flange 124 may be in contact with the tubular body 110. Alternatively, another sealing structure using tapered surfaces may be formed between the flange 124 and the tubular body 110.

FIG. 3B is a vertical cross-section view of a second modification of the sealing structure. This figure is an enlarged view of a region corresponding to the region enclosed by the dashed line in FIG. 2A. The tubular body 110 includes an annular tapered groove 411 located radially outside the annular groove 111 and extending along the circumference of the annular groove 111. The flange 124 of the sleeve 120 includes an annular tapered protrusion 421 located on an end surface nearer to the tubular body 110 and projecting from the whole circumference of the tubular body 110 toward its axial direction (the negative Y-axis direction). The tapered groove 411 of the tubular body 110 is inclined from the axial direction of the tubular body 110 (the Y-axis direction) to have smaller diameters at larger distances from a proximal end of the tapered groove 411 in the axial direction (the positive Y-axis direction.) The tapered protrusion 421 of the sleeve 120 is inclined from the axial direction of the sleeve 120 (the Y-axis direction) to have smaller diameters at larger distances from a distal end of the tapered protrusion 421 in the axial direction (the positive Y-axis direction.) In the configuration where the sleeve 120 is combined with the tubular body 110, the tapered groove 411 of the tubular body 110 and the tapered protrusion 421 of the sleeve 120 have the same inclination. (In the configuration where the sleeve 120 is separated from the tubular body 110, the tapered groove 411 of the tubular body 110 and the tapered protrusion 421 of the sleeve 120 may have the same inclination or different inclination angles.) When the nut 130 is screwed onto the tubular body 110, the tapered protrusion 421 is pressed into the tapered groove 411. Furthermore, the pressure P1 that the second section 132 of the nut 130 applies to the tube 300 and the pressure P3 that the tube 300 applies to the bulge portion 125 of the sleeve 120 cause pressure P8 to be applied from the tapered protrusion 421 to the tapered groove 411. Accordingly, the tapered protrusion 421 presses against and makes contact with the tapered groove 411 without any spaces therebetween. This can further improve the sealing properties between the tubular body 110 and the sleeve 120.

(6) Resin material of the fitting 100 according to the above-described embodiment of the invention is not limited to fluoropolymers. Alternatively, various polymers such as polyethylene, polypropylene, polycarbonate, polyamide, polyacetal, polyether ether ketone, polyphenylene sulfide, and polyimide are available. These can be selected appropriately depending on fields where the fitting 100 is used, applications of the fitting 100, material of the tube 300, or the like.

(7) The fitting 100 according to the above-described embodiment of the invention may serve as a member to connect pipes and devices, not only within equipment for manufacturing semiconductor, liquid-crystal, or organic electroluminescent devices, but also in piping systems of various plants, piping systems used in medical/pharmaceutical fields, and the likes.

What is claimed is:

1. A sleeve that is a cylindrical member for connecting a tube to a tubular body of a fitting, comprising:
    a first peripheral wall end portion including
        a tip end portion configured to be surrounded by a peripheral wall end portion of the tubular body and to cause an outer peripheral surface to face an inner peripheral surface of the peripheral wall end portion of the tubular body, and
        a base end portion configured to be placed outside the peripheral wall end portion of the tubular body in an axial direction of the tubular body; and
    a second peripheral wall end portion located on an opposite side of the tubular body in the axial direction thereof from the first peripheral wall end portion, and configured to be pressed into an open end portion of the tube,
    the first peripheral wall end portion including one of
        an annular protrusion configured to be pressed into an annular groove in the peripheral wall end portion of the tubular body, and
        an annular groove configured to allow an annular protrusion axially projecting from the peripheral wall end portion of the tubular body to be pressed thereinto,
    the second peripheral wall end portion including a bulge portion configured to expand a diameter of the open end portion of the tube from the inside thereof,
    an outer periphery of the base end portion of the first peripheral wall end portion including a flange configured to be axially spaced from and face the peripheral wall end portion of the tubular body, wherein
    an axial gap between the flange and the peripheral wall end portion of the tubular body is designed such that, when an axis of the sleeve begins to be tilted with respect to an axial direction of the tubular body, a corner of the flange comes in contact with the peripheral wall end portion of the tubular body to prevent the tilt of the axis of the sleeve.

2. A fitting for being connected to a tube, comprising:
    a tubular body including a peripheral wall end portion with an external thread extending axially;
    a sleeve configured to connect the tube to the peripheral wall end portion of the tubular body; and
    a nut including a first side configured to allow the tube to be inserted thereinto and a second side configured to allow the external thread of the peripheral wall end portion of the tubular body to be screwed thereinto,
    the sleeve including:
        a first peripheral wall end portion including
            a tip end portion configured to be surrounded by the peripheral wall end portion of the tubular body and to cause an outer peripheral surface to face an inner peripheral surface of the peripheral wall end portion of the tubular body, and
            a base end portion configured to be placed outside the peripheral wall end portion of the tubular body in an axial direction of the tubular body; and
        a second peripheral wall end portion located on an opposite side of the tubular body in the axial direction thereof from the first peripheral wall end portion, and configured to be pressed into an open end portion of the tube,
    the first peripheral wall end portion including one of
        an annular protrusion configured to be pressed into an annular groove in the peripheral wall end portion of the tubular body, and
        an annular groove configured to allow an annular protrusion axially projecting from the peripheral wall end portion of the tubular body to be pressed thereinto,
    the second peripheral wall end portion including a bulge portion configured to expand a diameter of the open end portion of the tube from the inside thereof,
    an outer periphery of the base end portion of the first peripheral wall end portion including a flange configured to be axially spaced from and face the peripheral wall end portion of the tubular body, wherein
    an axial gap between the flange and the peripheral wall end portion of the tubular body is designed such that, when an axis of the sleeve begins to be tilted with respect to an axial direction of the tubular body, a corner of the flange comes in contact with the peripheral wall end portion of the tubular body to prevent the tilt of the axis of the sleeve.

3. The fitting according to claim 2, wherein an outer periphery of the peak of the bulge portion of the sleeve is configured to receive a pressing force radially inward from an inner periphery of the nut.

* * * * *